United States Patent
Narusawa

(10) Patent No.: US 6,823,183 B2
(45) Date of Patent: Nov. 23, 2004

(54) TELEPHONE SYSTEM HAVING A TELEPHONE DIRECTORY INFORMATION

(75) Inventor: Hideki Narusawa, Tokyo (JP)

(73) Assignee: NEC Corporation, Tokyo (JP)

( * ) Notice: Subject to any disclaimer, the term of this patent is extended or adjusted under 35 U.S.C. 154(b) by 523 days.

(21) Appl. No.: 09/894,028

(22) Filed: Jun. 28, 2001

(65) Prior Publication Data

US 2002/0001380 A1 Jan. 3, 2002

(30) Foreign Application Priority Data

Jun. 28, 2000 (JP) .......................... 2000-194979

(51) Int. Cl.⁷ .............................................. H04M 1/00
(52) U.S. Cl. .............................. 455/412.1; 455/414.1; 455/550.1
(58) Field of Search .................. 455/550.1, 412.1, 455/566, 414.1, 414.2; 707/6; 701/209; 379/218.01

(56) References Cited

U.S. PATENT DOCUMENTS

| 5,978,800 A | * | 11/1999 | Yokoyama et al. ............ 707/5 |
| 6,125,287 A | * | 9/2000 | Cushman et al. ........... 455/566 |
| 6,424,908 B2 | * | 7/2002 | Urban et al. ................ 701/200 |
| 2002/0001380 A1 | | 1/2002 | Narusawa |

FOREIGN PATENT DOCUMENTS

| EP | 0 457 077 A3 | 11/1991 |
| JP | 4-239857 | 8/1992 |
| JP | 7-36924 | 2/1995 |
| JP | 7-319905 | 12/1995 |
| JP | 8-235160 | 9/1996 |
| JP | 11-85454 | 3/1999 |
| JP | 11-85795 | 3/1999 |
| WO | WO 99/09729 | 2/1999 |
| WO | WO 99/25136 | 5/1999 |

OTHER PUBLICATIONS

Help file (manual) of software, and reports published in computer newspapers i.e., Popular Computer Week: vol. 47, May 10, 1999, vol. 47, May 17, 1999, vol. 43 Apr. 19, 1999, vol. 43, Apr. 26, 1999, (National Library of China).

* cited by examiner

Primary Examiner—Cong Vantran
Assistant Examiner—Kiet T. Le
(74) Attorney, Agent, or Firm—Scully, Scott, Murphy & Presser

(57) ABSTRACT

A portable telephone system has a display unit for displaying items of names and telephone numbers retrieved by a retrieval section by using an input character string as a search key from telephone directory information. The display unit displays the items if the number of retrieved items retrieved by using a first input character is lower than or equal to a threshold, and displays only the number of items if the number of retrieved items is larger than the threshold. Desired items are again retrieved by using subsequent input character or characters as a search key. If the number of the thus retrieved items is lower than or equal to the threshold, the extracted items are displayed on the display unit.

2 Claims, 4 Drawing Sheets

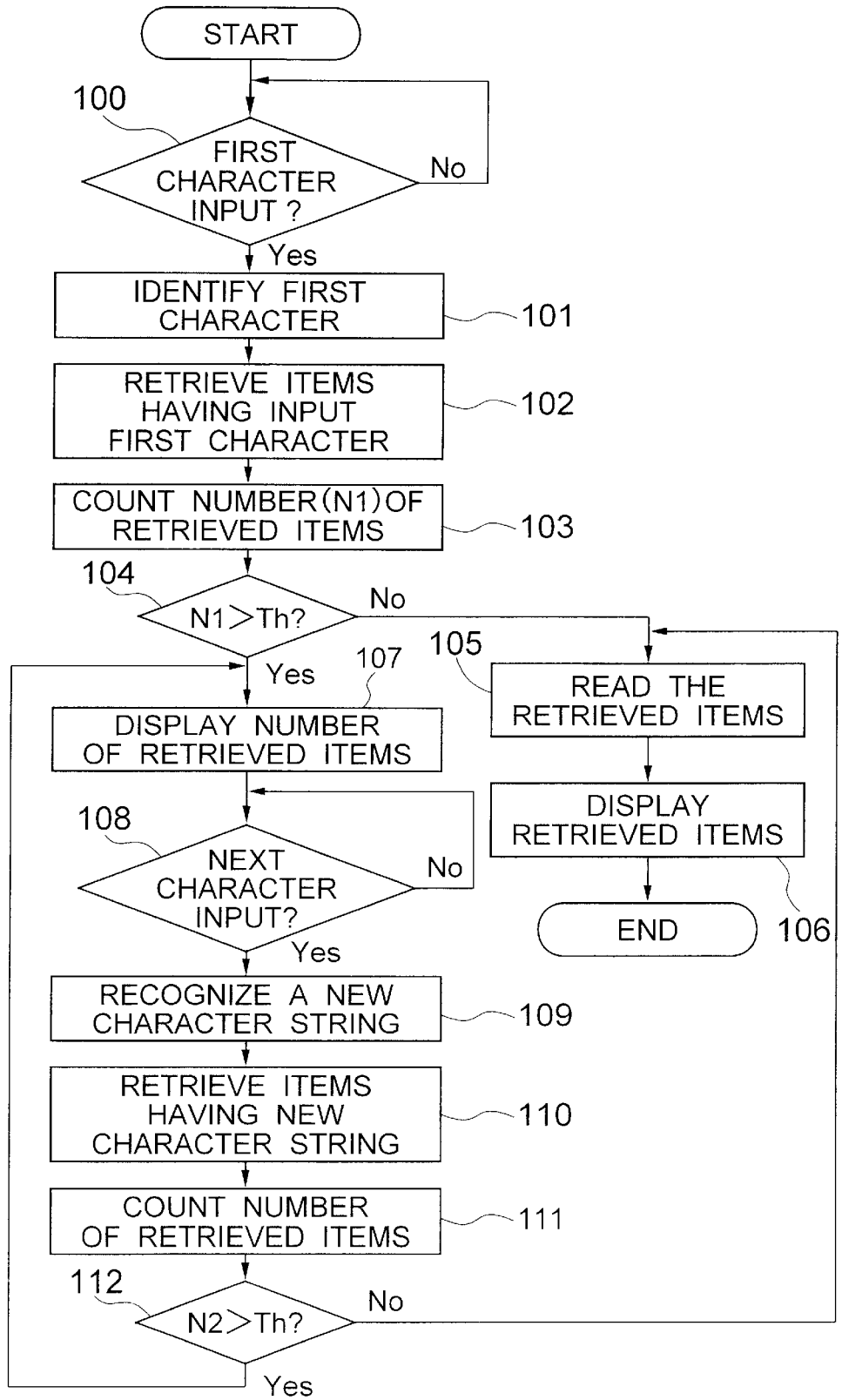

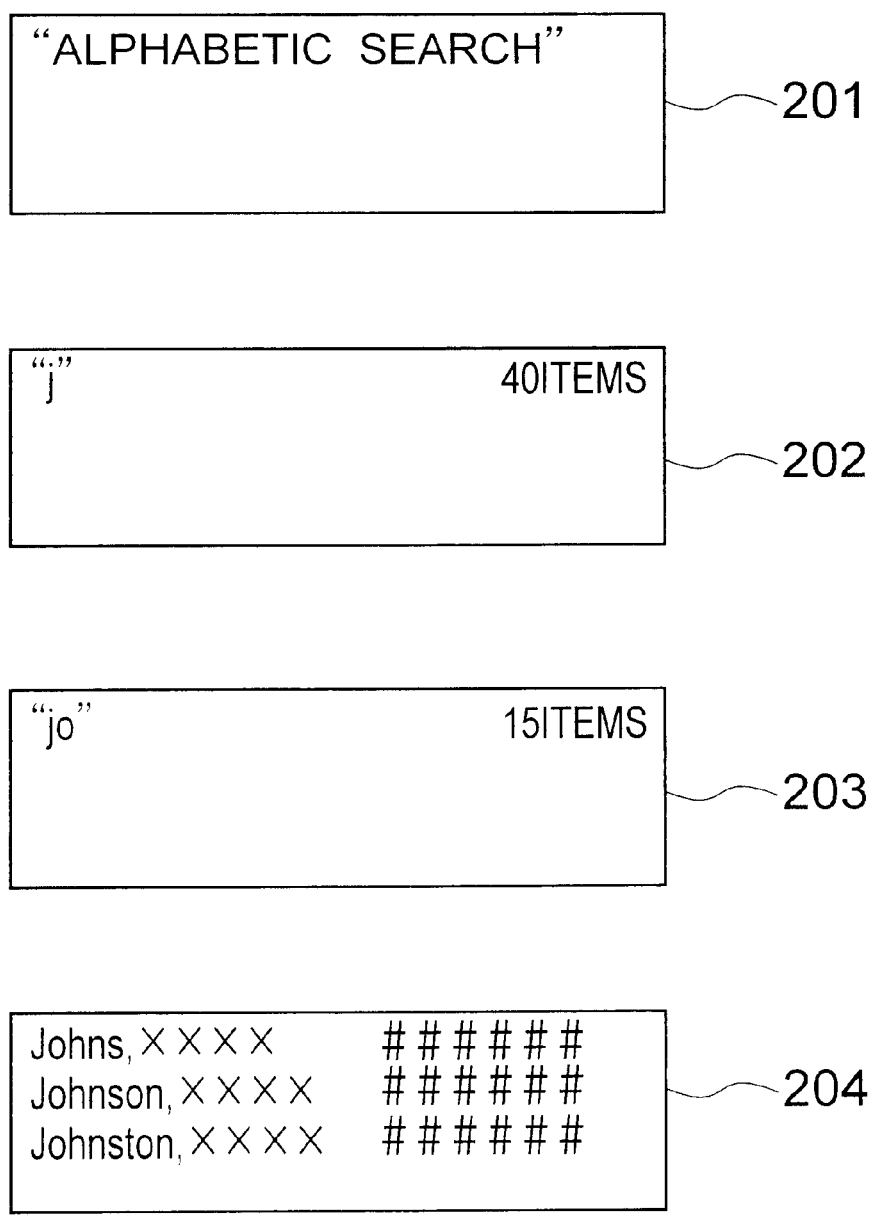

TELEPHONE SYSTEM HAVING A TELEPHONE DIRECTORY INFORMATION

BACKGROUND OF THE INVENTION (a) Field of the Invention

The present invention relates to a telephone system, such as a portable telephone system, having a telephone directory information and, more particularly, to a telephone system capable of retrieving and displaying items of names and telephone numbers stored as telephone directory information.

(b) Description of the Related Art

A telephone system is known which is provided with a telephone directory function for registering and storing items of names and corresponding telephone numbers, which are to be retrieved or searched by key operations. A user can select a desired name from the registered names of items by performing key operations while watching the display unit, and then make a telephone call to the telephone number of the selected item which is displayed on the display unit. A telephone directory function is particularly essential in the case of portable telephones (or or cellular phones), because carrying a separate telephone directory is troublesome and key operations are somewhat difficult in the portable telephone due to the smaller size of the keys.

As follows is a description of an example of a method for using the telephone directory function of a typical or conventional portable telephone system to select a name and make a call to that person.

First, the name of a person and the corresponding telephone number are registered and stored beforehand in the portable telephone as an item of the telephone directory information. Then, the user enters the first few characters of the name he wishes to call by using key operations, and searches the telephone directory information based on the entered character string. The portable telephone retrieves all the names from the registered telephone directory information, which include the few characters specified by the input character string, and displays those items of names and telephone numbers on the display unit. The user then uses a cursor to select the desired item for the name among the names displayed on the display unit and make a telephone call to the telephone number of the selected item.

In the manner as described above, the user can make a telephone call to the desired person without having to remember the telephone number, and furthermore without having to enter all the digits of the telephone number.

In the conventional telephone system as described above, the number of retrieved names obtained as a result of the retrieval differs depending on the input character string. Consequently, there are some occasions where the number of retrieved names including the entered character string is extremely large. In such a case, a large number of items of names are displayed on the display unit, and moving the cursor to select the desired item for the name among the large list of names takes a considerable length of time, which is undesirable to the users.

The number of names obtained from the retrieval can be reduced by entering a character string including a larger number of characters; however, this requires a large number of key operations, and thus another problem arises in which the key enter is annoying.

SUMMARY OF THE INVENTION

An object of the present invention is to provide a telephone system, such as a portable telephone system, in which a telephone number for a desired person can be easily selected from the information stored in a registered telephone directory.

The present invention provides, in one aspect thereof, a method for searching a desired item from stored information by using a character string sequentially input, the method including the consecutive steps of: (a) retrieving items from the stored information by using at least one first input character as a search key and counting a number of retrieved items; (b) comparing the number of the retrieved items against a first threshold; (c) displaying the retrieved items or the number of retrieved items on a display unit depending on the number of the retrieved items being smaller or larger than the first threshold; (d) again retrieving items from the stored information, if the number of retrieved items is displayed on the display unit in the step (c), by using a character string including the at least one first input character and at least one next input character as a search key and counting a number of the thus retrieved items; and (e) iterating the steps of (b) to (d) until the desired item is displayed on the display unit in the step (c).

The present invention also provides, in another aspect thereof, a telephone system including:

a storage unit for storing information: a retrieval section for retrieving items from the information stored in said storage unit by using a first input character in a character string as a search key; a counter for counting a number of items retrieved by said retrieval section; a comparator for comparing the number counted by said counter against a first threshold to generate a display signal or the retrieval signal depending on the number counted by said counter being smaller or larger than the threshold; and a display unit for displaying thereon the items upon generation of the display signal and displaying the number counted by the counter upon generation of the extraction signal, said retrieval section retrieving at least one item from the information by using the first input character and a next input character after generation of the retrieval signal.

In accordance with the method and the telephone system of the present invention, the user does not have to use a specific operation to reduce the number of retrieved items except for inputting a next character in the character string.

The above and other objects, features and advantages of the present invention will be more apparent from the following description, referring to the accompanying drawings.

BRIEF DESCRIPTION OF THE DRAWINGS

FIG. 3 is a flowchart showing the operations for searching a desired telephone number from the telephone directory information of the portable telephone system of FIG. 1, and then making a call to the person at that telephone number.

FIG. 4 is an explanatory diagram showing the flow of display during searching a desired telephone number from the telephone directory information of the portable telephone system of FIG. 1.

PREFERRED EMBODIMENTS OF THE INVENTION

Now, the present invention is more specifically described with reference to accompanying drawings.

Figure 1:
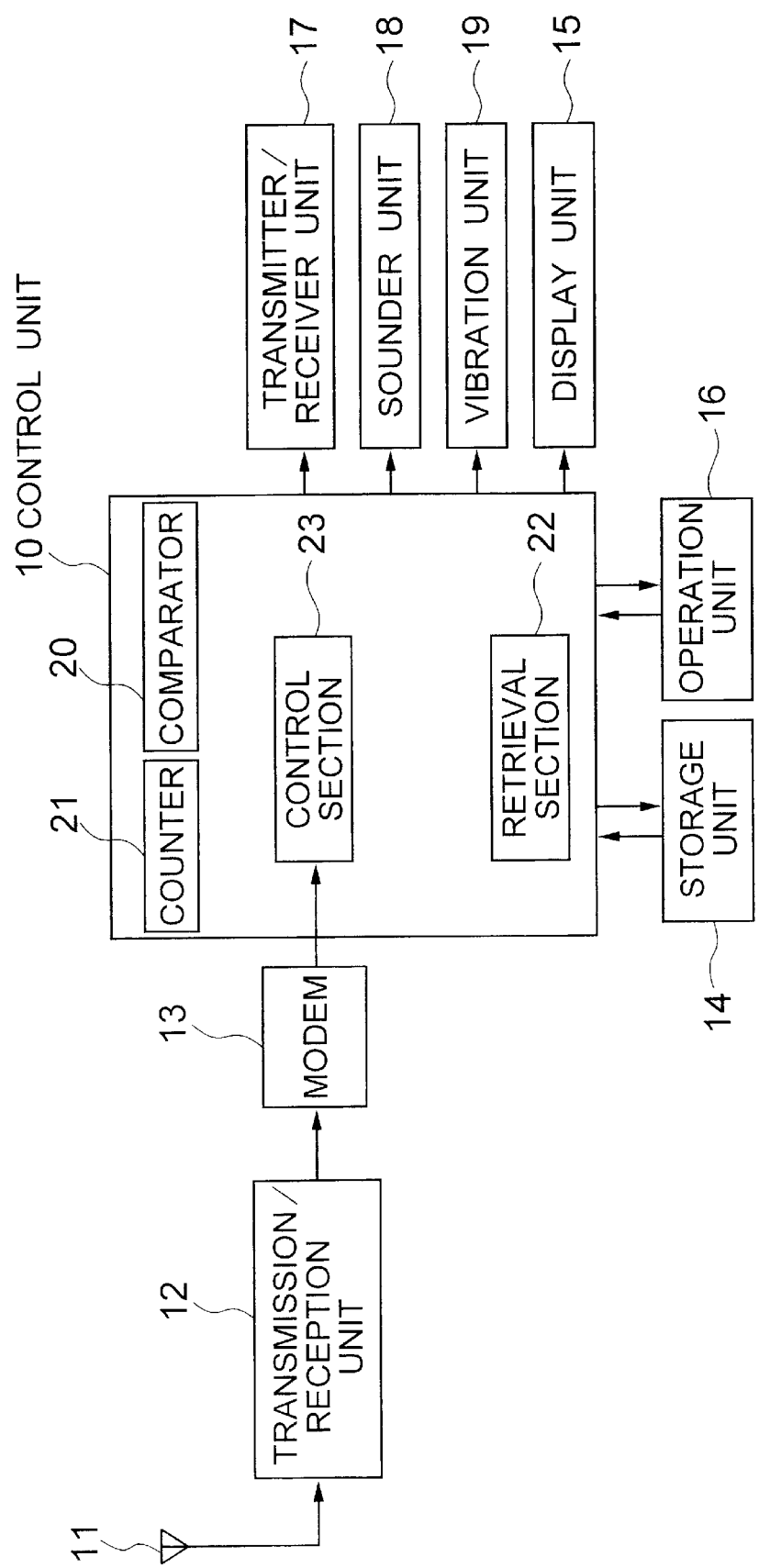
FIG. 1 is a block diagram showing the configuration of a portable telephone system according to an embodiment of the present invention.

Referring to FIG. 1, a portable telephone system according to an embodiment of the present invention includes an antenna 11, a wireless transmission/reception unit 12, a modem (modulator/demodulator) 13, a storage unit 14, a display unit 15, an operation unit 16, a transmitter/receiver unit 17, a sounder 18, a vibrator 19, and a control unit 10. The control unit 10 is generally implemented as CPU and includes a plurality of functional blocks including a comparator 20, a counter 21, a retrieval section 22 and a control section 23. The control section 23 controls the other functional blocks as well as the other units in this embodiment.

The wireless transmission/reception unit 12 has a reception function for filtering and amplifying signals received through the antenna 11, and a transmission function for amplifying and filtering transmission signals and transmitting the signals through the antenna 11.

The modem 13 has a function for demodulating signals subjected to reception processing in the wireless transmission/reception unit 12, and a function for outputting modulated transmission signals to the wireless transmission/reception unit 12.

The storage unit or flash memory 14 stores telephone directory information which is registered in such a way that the telephone number for any desired person can be added, altered or deleted by the user, as well as a program for operating the portable telephone system of the present embodiment.

Figure 2:
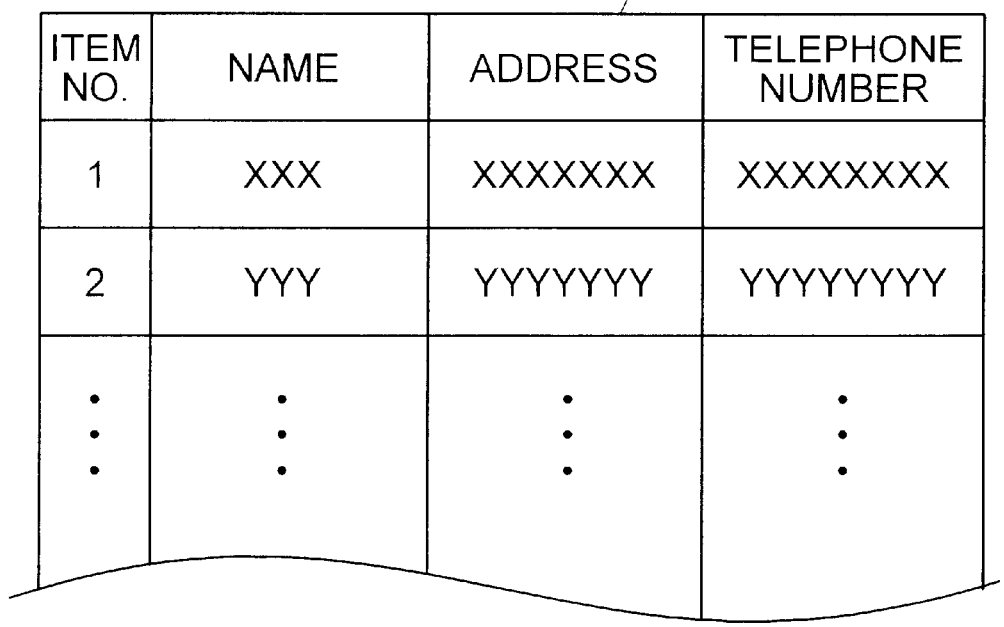
FIG. 2 is data configuration diagram showing the configuration of telephone directory information in the portable telephone system of FIG. 1.

Referring to FIG. 2 showing the table of the telephone directory information stored in the storage unit 14, a plurality of items each including a name, a corresponding address (or corporate name) and a corresponding telephone number are registered and stored in the telephone directory information. If the telephone system is adapted for use of Kanji characters, the address column is replaced by a phonetic column which includes phonetic characters for the Kanji characters in the name column.

The display unit 15 displays information such as names and telephone numbers, the date, the time, and other information in accordance with the commands supplied from the control section 23.

The operation unit 16 includes a plurality of number/character keys and a plurality of function keys for registering telephone directory information and searching for telephone numbers, as well as for performing other operations such as making telephone calls, responding to received calls or disconnecting, and delivers the information of operations by the user to the control section 23.

The transmitter/receiver 17 includes a speaker and a microphone, and transmits/receives conversation voices and the rings of received calls.

The sounder 18 generates the ringing sound or the like to notify the user of a received call.

The vibrator 19 vibrates the portable telephone to notify the user of a received call or the like. Either one of the sounder 18 and the vibrator 19 may be used to notify the user of a received call, or alternatively, both may be used.

The comparator 20 stores a threshold set at a default which is optionally replaced by the user, and compares the number of items of names obtained by retrieval from the telephone directory information against the threshold.

At the time of a telephone directory search, after the retrieval section 22 of the control unit 10 searches the telephone directory information stored in the storage unit 14 by using a first input character in the character string entered from the operation unit 16, the counter 21 counts the number of items of the names retrieved using the first input character. The comparator 20 compares this number of items counted by the counter 21 against the threshold set therein. Then, if the number of retrieved items is larger than the threshold, the control section 23 allows the display unit 15 to display the number of items thereon, whereas if the number of the retrieved items is less than or equal to the threshold, the control section 23 allows the display unit 15 to display the items each including a name and a telephone number thereon in the order of the alphabet by name.

After the number of items is displayed on the display unit 15, the retrieval section 22 again retrieves items from the directory information by using the first input character and a next input character as a search key. The counter then counts the number of retrieved items, and the comparator 20 compares the number counted by the counter 21 against the threshold. If the number of the thus retrieved items is smaller than or equal to the threshold, then retrieved items are displayed on the display unit 15, whereas if the number of the thus retrieved items is larger than the threshold, then the number of the retrieved items is displayed instead on the display unit 15. The retrieval by the retrieval section 22, the count by the counter 21 and the comparison by the comparator 20 are iterated each time a new character is input until the number of the retrieved items becomes below or equal to the threshold.

In an alternative, the retrieval section 22 may includes an extraction function, which extracts items including the desired item from the first retrieved items by using a new character as a search key for the extraction.

The control section 23 registers the name, address (or corporate name), telephone number and appended information entered from the operation unit 16 into the telephone directory information in the storage unit 14 during a telephone directory registration, and transfers the count by the counter 21 to the display unit 15 during a telephone directory search. In addition, the control section 23 also controls the operations of the storage unit 14, the display unit 15, the operation unit 16, the transmitter/receiver 17, the sounder 18 and the vibrator 19 of the portable telephone of the present embodiment.

An example of communication operations using the portable telephone system of the present embodiment will be described hereafter.

Wireless waves from a base station (not shown in the drawings) are received by the antenna 11 and amplified by the wireless transmission/reception unit 12, and signals demodulated by the modem 13 are then supplied to the control section 23 as either voice signals or control signals. Voice signals are subjected to voice signal processing and conversion to analog signals in a codec (coder-decoder) of the control section 23 not shown in FIG. 1, and are then output as sound from the speaker in the transmitter/receiver 17. Control signals are analyzed by the control section 23 and used in a variety of processing.

Voices input via the microphone of the transmitter/receiver 17 are subjected to voice signal processing in the codec section of the control section 23, are modulated by the modem 13, amplified by the wireless transmission/reception unit 12 and then transmitted through the antenna 11 to the base station. Control signals generated by the control section 23 are modulated by the modem 13, amplified by the wireless transmission/reception unit 12, and then transmitted from the antenna 11.

Next is a description of the operations for setting the threshold in the comparator 20 of the present embodiment.

The user selects the threshold setting mode by operating the operation unit 16 while watching the display on the display unit 15. If the user then enters the desired threshold via the operation unit 16, the threshold information is supplied to the control section 23. Receiving this threshold information, the control section 23 registers the threshold in the comparator 20. In this manner, the user can set the threshold to any desired value.

Furthermore, registration of threshold information may also be carried out by connecting an external apparatus to the portable telephone system and then providing threshold information from this external apparatus. In such a case, the threshold is set by the maker or a company in the communication industry as a default.

Furthermore, threshold information may also be stored in the storage unit 14 instead of the comparator 20. In such a case, if a number of items is received from the counter 21, the comparator 20 retrieves the threshold stored in the storage unit 14 via the control section 23, and then performs the comparison.

An example of the operations for registering telephone directory information in the portable telephone system of the present embodiment will be described hereafter.

When a new name is to be registered in the telephone directory information, the user first selects the name registration mode by operating keys in the operation unit 16 while watching the display on the display unit 15. Then, once the display of the display unit 15 is set to a status of awaiting entering of a name, the desired name is entered using the operation unit 16, and this name information is supplied to the control section 23. Subsequently, the display on the display unit 15 shifts to a status of awaiting entering of a telephone number, and after the telephone number is entered, this telephone number information is also supplied to the control section 23. The name and telephone number are correlated and then registered by the control section 23 in the telephone directory information of the storage unit 14.

Next is a description of the operations for searching a desired telephone number in the telephone directory information of the portable telephone system of the present embodiment, and then making a call to the person at that telephone number.

Referring to FIG. 3, there is shown a flowchart of the search for a desired name and a corresponding telephone number. The user first selects the telephone directory search mode by operating the operation unit 16, and then at step 100, enters a first character by using the operation unit 16. The entered character is supplied to the counter 21 via the control section 23.

The retrieval section 22 identifies the first character at step 101, searches the telephone directory information of the storage unit 14 to identify the names each beginning with the first character, and generates a coincidence signal each time the retrieval section 22 identifies such a name at step 102. The counter counts the coincidence signals at step 103. The result of the count by the counter 21 is delivered to the comparator 20.

At step 104, the comparator 20 compares the number of retrieved items against the threshold. If it is judged in step 104 that the number of the retrieved items is less than or equal to the threshold, the retrieved items each having a name and a telephone number are read from the telephone directory information of the storage unit 14 at step 105. The names and the telephone numbers of these items are then displayed on the display unit 15 at step 106. The display at this point is listed in the order of alphabet by name. If it is judged at the step 104 that the number of retrieved items is larger than the threshold, the number of retrieved items is displayed instead on the display unit 15 at step 107.

Subsequently, at step 108, the display on the display unit 15 is maintained until the next character is entered from the operation unit 16. After a next character is entered using the operation unit 16, the next character is supplied to the retrieval section 22 via the control section 23.

The retrieval section 22 identifies the next character at step 109, and adds the next character at the rear of the first character or the end of the character string used in the previous search to generate a new character string. At step 110, the retrieval section 22 retrieves from the telephone directory information of the storage unit 14 the items of names beginning with the new character string, and generates a coincidence signal each time the retrieval section 23 identifies such a name. The counter counts the coincidence signals at step 111. This search may also be performed on just the names for extraction of items from the previous items obtained by the previous retrieval or extraction. The count on the number of new retrieved items is then transmitted to the comparator 20.

At step 112, the comparator 20 compares the number of new retrieved items against the threshold. If the number of the new retrieved items is less than or equal to the threshold, the process advances to step 105 wherein the names and the telephone numbers are displayed on the display unit 15, whereas if the number of retrieved items is greater than the threshold, the process returns to step 107.

Next, one example of the flow of display of the display unit 15 when a search is performed for a desired telephone number in the telephone directory information will be described.

Referring to FIG. 4, there is shown an explanatory diagram showing the flow of display on the display unit 15 when a search is performed for a desired telephone number from the telephone directory information of the portable telephone system. It is assumed that the example shown is such that a desired telephone number is searched by using three characters of the alphabetic notations of names as a search key, and that the threshold set in the comparator 20 is ten.

After the user operates keys on the operation unit 16 to select the alphabetic search mode, characters "alphabetic search" is displayed on the display unit as shown by the screen 201. If, for example, character "j" is then entered using the operation unit 16, the portable telephone counts the names in the telephone directory information starting with the character "j". If 40 items are retrieved by using the character "j" as a search key, this number of retrieved items is greater than the threshold of ten. Thus, the display unit 15 displays characters "40 items", for indicating that the number of searched items is 40 and is greater than the threshold, as shown by the screen 202.

If the user then enters the character "o" after "j", then the telephone system counts the names in the telephone directory information starting with the characters "jo". If 15 items are retrieved, this number of retrieved items is still greater than the threshold of ten. Thus, the display unit 15 displays characters "15 items", for indicating that the number of searched items is 15 and is greater than the threshold, as shown by the screen 203.

If the user then enters the character "h", then the portable telephone counts the names in the telephone directory information starting with the characters "joh". If three items are retrieved, this number of the retrieved items is less than the threshold of ten. Thus, the display unit 15 displays the searched name and the respective telephone numbers as shown in the screen 204.

In the portable telephone, as described above, if the number of retrieved items is greater than the threshold, the number of retrieved items is displayed, whereas if the number of retrieved items is less than or equal to the threshold, the names and telephone numbers are automatically displayed. Since the display is automatically updated on the screen after entering each character, the user need not judge the number of retrieved items suitable for display, and can narrow down the number of items to a suitable number suitable for display by entering a minimum number of characters. Consequently, a telephone number search can be performed relatively with ease. Furthermore, since the search is completed with a minimum of key input, the power dissipation in the portable telephone system associated with the key entering is also reduced.

Although a single character of the name is input as a first input character or a next input character in the embodiment, a plurality of characters of the name may be used as the first input character or the next input character. In addition, the corporate name or address may be used instead of the personal name as a search key.

Moreover, a telephone number search on the portable telephone system of the present embodiment is not limited to the alphabetic search, and desired telephone number search can also be performed by matching the beginning portion of the telephone number to search a desired telephone number.

If Kanji characters or other characters which do not necessarily define a single phonetic symbol are used for identifying the name, the phonetic characters should be also stored and used for the search instead of the Kanji characters.

The present invention is not limited to the searching of telephone number as shown in the present embodiment, and may also be applicable to other information stored in the portable telephone such as E-mail address or corporate name or address.

Furthermore, the present invention is not limited to portable telephones as shown in the embodiment, and may also be applied to searches of telephone numbers and the like registered in fixed telephones or cordless telephones.

In addition, the present invention may also be applied to searches when information including address records or the like which correlate names, zip codes and addresses are stored in the storage unit. In such a case, either the name, the zip code, or the address may be specified as the search key.

Moreover, in portable telephone system including a color display panel as the display unit, a first threshold and a second threshold wherein first threshold<second threshold may be used in the comparator. In this case the number of the retrieved items is compared against both the first and second thresholds. Then, the relevant names and telephone numbers are displayed if the number of retrieved items is less than or equal to the first threshold, whereas the number of retrieved items is displayed if the number of retrieved items is greater than the first threshold. In this case, the color of the display unit is changed between the first case where the number of retrieved items is greater than the first threshold and less than or equal to the second threshold, and a second case where the number of retrieved items is greater than the second threshold. The number of retrieved items in the first case is displayed in a first color, whereas the number of retrieved items in the first case is displayed in a second color. The display in the first color allows the user to expect that input of next character may display the retrieved items.

During the process of entering one character at a time until the point is reached where the number of retrieved items is suitable for display, the approximate number of retrieved items can be easily ascertained by the color of the display unit, and so a telephone number search can be performed relatively easily.

Since the above embodiments are described only for examples, the present invention is not limited to the above embodiments and various modifications or alterations can be easily made therefrom by those skilled in the art without departing from the scope of the present invention.

What is claimed is:

1. A method for searching a desired item from stored information by using a plurality of characters sequentially input as a search key, the method comprising the consecutive steps of:
   (a) retrieving items from the stored information by using at least one first input character as a search key and counting a number of retrieved items;
   (b) comparing the number of the retrieved items against a first threshold;
   (c) displaying the retrieved items or the number of retrieved items on a display unit depending on the number of the retrieved items being smaller or larger than the first threshold;

(d) again retrieving items from the stored information, if the number of retrieved items is displayed on the display unit in the step (c), by using a character string including the at least one first input character and at least one next input character as a search key and counting a number of the thus retrieved items; and (e) iterating the steps of (b) to (d) until the desired item is displayed on the display unit in the step (c), wherein:
the step (b) further includes comparing the number of the retrieved items against a second threshold, the first threshold being smaller than the second threshold; and
the step (c) includes displaying the number of the retrieved items in a first color or in a second color depending on the number of the retrieved items being between the first threshold and the second threshold or larger than the second threshold.

2. A telephone system comprising:

a storage unit for storing information:
a retrieval section for retrieving items from the information stored in said storage unit by using at least one first input character in a character string as a search key;
a counter for counting a number of items retrieved by said retrieval section;
a comparator for comparing the number counted by said counter against a first threshold to generate a display signal or a the retrieval signal depending on the number counted by said counter being smaller or larger than the threshold; and
a display unit for displaying thereon the items upon generation of the display signal and displaying the number counted by the counter upon generation of the retrieval signal, said retrieval section retrieving at least one item from the information by using the at least one first input character and at least one next input character after generation of the retrieval signal, wherein:
said comparator compares the number of the retrieved items against a second threshold, the first threshold being smaller than the second threshold; and
said display unit displays the number of the retrieved items in a first color or in a second color depending on the number of the retrieved items being between the first threshold and the second threshold or larger than the second threshold.

* * * * *